US007790044B2

(12) United States Patent
Canaleo

(10) Patent No.: US 7,790,044 B2
(45) Date of Patent: Sep. 7, 2010

(54) METHOD AND APPARATUS FOR SEPARATION OF CHEMICAL MATERIALS FROM FECES

(75) Inventor: Frank J. Canaleo, Kansas City, MO (US)

(73) Assignee: NOWA Technology, Inc., Prairie Village, KS (US)

( * ) Notice: Subject to any disclaimer, the term of this patent is extended or adjusted under 35 U.S.C. 154(b) by 0 days.

(21) Appl. No.: 11/729,070

(22) Filed: Mar. 28, 2007

(65) Prior Publication Data

US 2007/0227985 A1 Oct. 4, 2007

Related U.S. Application Data

(63) Continuation-in-part of application No. 11/397,434, filed on Apr. 4, 2006.

(51) Int. Cl.
*C02F 1/00* (2006.01)
(52) U.S. Cl. ...................................................... 210/770
(58) Field of Classification Search .................. 210/770
See application file for complete search history.

(56) References Cited

U.S. PATENT DOCUMENTS 4,094,740 A    6/1978  Lang

| 5,009,672 A  | 4/1991  | Ruffo |
| 5,779,164 A  | 7/1998  | Chieffalo |
| 5,810,903 A  | 9/1998  | Branconnier |
| 6,143,176 A  | 11/2000 | Nagamatsu |
| 6,200,475 B1 | 3/2001  | Chen |

FOREIGN PATENT DOCUMENTS

WO    WO8600788 A1  *  2/1986
WO    WO 2004/099115 A1  *  11/2004

\* cited by examiner

*Primary Examiner*—Walter D Griffin
*Assistant Examiner*—Denise R Anderson
(74) *Attorney, Agent, or Firm*—Sheldon H. Parker

(57) ABSTRACT

A method and apparatus for treatment of feces is present in which usable organic and inorganic chemical compounds and substances are extracted from the fecal material for reuse. The process and apparatus includes receiving a mixture of fecal material from various sources, separating the liquid from the solids for further processing or disposal, mixing the solids with an acid and/or solvent solution to break down the solids into components to be extracted, filtering solids from the mixture, distilling the filtrate to remove remaining solvents, reacting the remaining solids with a metal hydroxide solution to yield fats, fatty acids, oils, alcohols, sugars, and other minerals, and further processing these materials to produce lubricants, grease, emulsifiers, biodiesel, fuels and/or fertilizers.

7 Claims, 2 Drawing Sheets

METHOD AND APPARATUS FOR SEPARATION OF CHEMICAL MATERIALS FROM FECES

CROSS-REFERENCE TO RELATED APPLICATIONS

The present application is a continuation-in-part application of Ser. No. 11/397,434 filed on Apr. 4, 2006 which is hereby incorporated into the present application by reference.

FIELD

The present invention relates to a method and apparatus for treatment of feces, and more particularly, to a method and apparatus for the separation, reuse and recycling of various organic and inorganic chemical compounds found in feces.

BACKGROUND

Disposal and/or treatment of feces produced daily by humans and livestock is a growing problem. As the human population grows, existing treatment plants become overburdened or outdated and new treatment plants must be built. More livestock are raised to meet the growing food needs of the human population resulting in an increase in animal waste. Additionally, a current practice is to concentrate more livestock in smaller areas to improve efficiency and increase the profitability of the livestock operation. This concentration creates a greater burden on the waste control, removal and treatment system. This waste is a problem from the standpoint of cost associated with handling and disposing of so many tons per day. Many small cities faced with a growing local population are sometimes put in a position where they must either spend large amounts of money to increase their waste treatment facilities or run the risk of possible contamination to water supplies due to an overburdened system.

SUMMARY OF THE INVENTION

The present invention provides a method and apparatus for the separation of chemical materials from feces (human, pig, cattle and fowl, for example). Raw feces is collected and an array of unit operations are performed in a specified manner to extract organic material from the feces. This allows for the capturing and reuse of certain chemical materials present in feces. All feces from all mammals are about the same in makeup. The differences are in the percentages of different chemical groups and the types of individual materials found. However, the treatment of the feces these sources will be the same for the others. The collection points may be from a municipal waste facility for human feces or from a farm feces collection area.

The above aim is reached by this combination of unit operations that allows separation of some of the chemical groups from other chemical groups in the organic portions present in feces.

There are many processes that can be used to separate some of this water from the solids although different methods and conditions will vary the amount of dewatering possible. Centrifugation, filtering and dehydration are all common and well known methods. All of these methods have different efficiencies and costs. In the present invention, the preferred method is pressure filtration which is utilized due to its efficiency and low cost. It has been used in sewerage waste treatment plants for many years is capable of producing a filtrate that is consistently less than 1% in solids and a filter cake that is at least 25% percent solids. The filtrate may be treated with enzymes and yeast to produce an alcohol.

In the raw mix tank the organic portion of the feces is mixed with an organic solvent such as aliphatic, ketone, ether or alcohol, for example. This allows a portion of the organic chemicals in the feces to dissolve. The mixture is then pumped or augured to a raw filter tank. However, the mix tank and filter tank may be the same unit operation. Here the solids that did not dissolve in the organic solvent are separated from the liquid and sent to a washed raw solids holding tank for disposal or to be further processed.

The liquid from the raw filter tank is sent to a filtrate holding tank where it awaits the next step. The filtrate holding tank also serves as a serge tank to allow for the proper amount of liquid to be sent to the next unit operation which is the distillation unit.

In the distillation unit, the solvent is distilled from the solids and the solvent sent back to a solvent holding tank to be reused. The solids left after distillation are pumped or augured to the solids holding tank. This tank also acts as a surge tank to allow the proper amount of solid material to be sent to the next step, which is mixing with a metal hydroxide solution.

It's here that the solids are mixed with the metal hydroxide dissolved in water and agitated. Certain acidic components of the solids will react with the metal hydroxide to form the metallic salt of the acidic components. These will be in solution in the water stage with the excess metal hydroxide. There will also be some other organic materials that will not react or be affected by the metal hydroxide. These will stay in the organic phase and there will be a phase separation.

This material is then pumped to a separation tank. There are many ways of separating a two phase system. Centrifugation can be utilized. It's quite common and well known in the chemical industry. Another type of separation is settling, where the two components will separate due to their differences in polarity and density. In this case the nonpolar phase and other viscous liquids will float atop of the aqueous phase containing the unused metal hydroxide and acidic salts in solution.

The nonpolar phase and viscous liquids are then pumped or augured to the solids holding tank for shipping and the aqueous phase containing the metal hydroxide and acidic salts in solution are sent to another tank for shipping.

DETAILED DESCRIPTION

Figure 1:
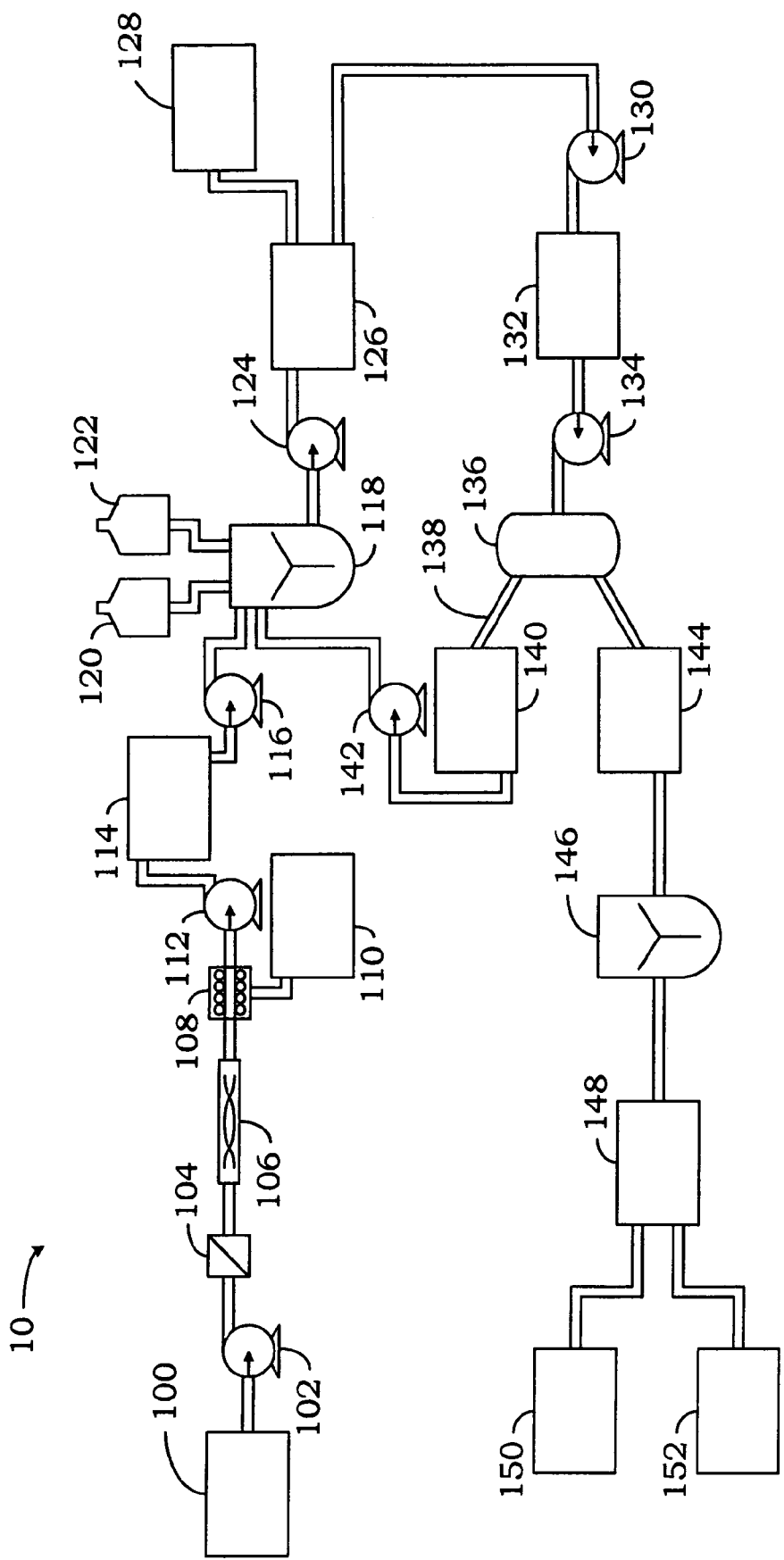
FIG. 1 is a schematic illustration of the process and apparatus of the present invention for treatment of waste.

Referring to FIG. 1, a method and apparatus for separation of chemical materials from feces is generally indicated by reference numeral 10. Feces is brought into the plant and sent to a feces holding tank 100. At this point the fecal material may be from 4% to 50% solids as the remainder is water and water soluble minerals. From the feces or waste collection point 100 the feces is pumped 102 through a screen filter 104 or other commercially common filtering media to remove large objects and any large debris such as sticks, leaves, plastic bottles and cans, for example. The remaining water and solids are mixed either inline or in a mix tank 106 or other commercially common mixer including a mix tank with a motor driven shaft and impeller. From here the blended material is sent through a pressurized filter 108 to remove as much water as possible. This operation could be a belt press filter or other commercially available pressure filter that squeezes or somehow releases as much water or aqueous solution as possible from the solid material.

The water filtrate is pumped to an aqueous filtrate holding tank 110. The water may be processed further or disposed. Generally, the water is low in sugars but, depending on the source of the feces or waste, the water may be further processed to remove the sugars and carbohydrates to be fermented to produce ethyl alcohol. Additionally, the water filtrate typically includes nitrogen, phosphorus and amino acids, for example, which may be used as a fertilizer.

From here the dewatered solids may be sent to a dryer where almost all of the water is dehydrated from the solids, leaving the solids as a granular or powder material. To obtain the most surface area for the material it may be put through a grinder, ball mill or other commercially available unit operation to make smaller particles and increase reactive surface area. The solids are then delivered, either by pump or auger elevator or pneumatically 112 to a solids cake holding tank 114.

From here the material is delivered either by auger or pump 116 to a mix tank 118 where the solids are mixed with a small amount of acid 120 and solvent 122 mixture or solvent alone. Tank 118 is a closed mix tank where the solids are mixed with an acid solvent blend consisting of an acid where the pH may be between 0.0 and 6.5. Depending on the composition of the solids, the ratio of acid to solvent in the acid solvent blend may be one acid to 100 solvent by weight or may be 100 acid to one solvent. The solids may be mixed with either this acid solvent blend or with a pure solvent or a mixture of solvents without adding any acid. The solvent may be an aromatic, aliphatic, ketone, ether or alcohol, for example. The solvent may also be a mixture of the solvents mentioned. The ratio of the weight of acid solvent blend or solvent (now called the liquid to weight of dry solids) may be one to one or as high as one part dry solid to eighty parts liquid.

The mixture at this point may be heated to speed the reaction of the solids with the acid and/or solvent. At this point oxygen or other gases released from the mixture through the reaction with acid may be driven from the closed mix tank 118 by flushing with nitrogen or an inert gas, for example, or the gases be left in the tank. The mixture is stirred in the tank by a mixing device such as a motor with a shaft and propeller or by recirculating with a pump or by an inline pump. The time of mixing may be from one minute to twenty four hours depending on the reaction speed of the mixture. The fecal material can be mixed anywhere from one to four times with this liquid and allowing the mixture to rest between mix cycles, or a countercurrent continuous wash may be used.

After mixing, the material is filtered, either in the same mix tank, or a tank specifically designed for filtering. Pressure filtering or centrifugation may also be used. The mixture is pumped 124 to a filter tank 126 to filter out any material that is not in solution which is pumped or augured to a solids holding tank 128 for further processing or disposal. From here the liquid material is pumped or augured 130 to a liquids holding tank 132 for further processing. The liquid at this stage now contains the extracted material released from the feces during the mixing stage.

From here the liquid containing material extracted in solution from the feces is pumped 134 to a distillation unit 136 where the liquid can be separated from the material extracted from the feces. The extracted material is the product desired. Solvent is distilled off through a distillation line 138 to a solvent holding tank 140. The solvent is condensed and may be pumped 142 to the mix tank 118 for reuse in the cycle.

The solids left after distillation are pumped or augured to the solids holding tank 144. It should be understood that the solids may include viscous liquids or oils that have a higher boiling point than the distilled solvent, and thus remain with the solids. This tank also acts as a surge tank to allow the proper amount of solid material to be sent to the next step, which is mixing with a metal hydroxide solution. Solids from the solids holding tank are sent to a mix tank 146 to be mixed with the metal hydroxide dissolved in water. Certain acidic components of the solids will react with the metal hydroxide to form the metallic salt of the acidic components. These will be in solution in the water stage with the excess metal hydroxide. There will also be some other organic materials that will not react or be affected by the metal hydroxide. These will stay in the organic phase and there will be a phase separation.

After the reaction with the metal hydroxide, the material is pumped to a separation tank 148. There are many ways of separating a two phase system. Centrifugation may be utilized. Another type of separation is settling, where the two components will separate due to their differences in polarity and density. In this case the polar phase will float atop of the aqueous phase containing the unused metal hydroxide and acidic salts in solution.

The solids are then pumped or augured to the solids holding tank 150 for shipping or further treatment. The fats or fatty acids in the solids may be reacted with potassium to create a water soluble lubricant, for example, or reacted with magnesium or calcium to form a grease. The oils resulting from the reaction may be used as a lubricant or may be further reacted with sodium hydroxide, commonly known as lye, and methanol to create biodiesel. The aqueous phase containing the metal hydroxide and acidic salts in solution are sent to another tank 152 for shipping or further processing. The long chain alcohols remaining in the liquid may be used for fuel or emulsifiers, for example.

Figure 2:
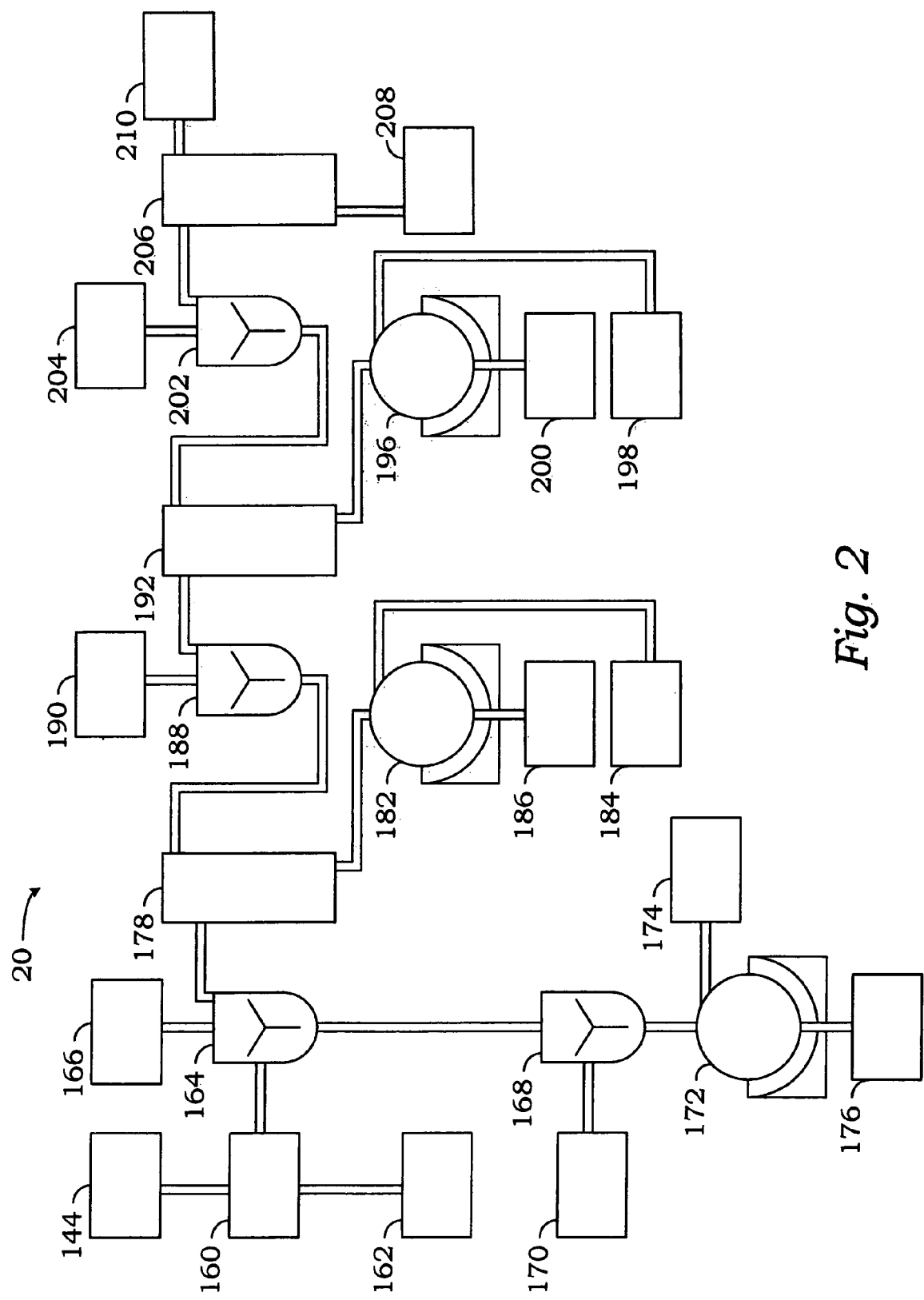
FIG. 2 is a schematic illustration of a further process and apparatus of the present invention for treatment of waste.

Referring to FIG. 2, alternatively or additionally processing may be made on the solids or pretreated feces in the solids holding tank 144. The solids may include viscous liquids or oils that have a higher boiling point than the distilled solvent, and thus remain with the solids. Additionally, some of the solvent may be contained in the solids. The oils and some or all of the minerals are separated by filter 160 with the minerals being sent to a storage tank 162. These minerals may be sold as a fertilizer or further separated into their individual components by crystallization or competitive saturation. The oils are then transferred to a mix tank 164. Acid and water are added to the mix tank 164 from tank 166. This mixture is continuously mixed as additional oil is added from filter 160, and water and acid is added from tank 166.

The contents of mix tank 164 may be transferred to another mix tank 168 where a caustic solution is added from tank 170 to neutralize the mixture. The neutralized mixture is transferred to evaporator 172. The evaporated water is transferred to tank 174 and the separated minerals are transferred to tank 176. These minerals may be sold as a fertilizer or further separated into their individual components by crystallization or competitive saturation.

Alternatively, the mixture may be pumped or other wise transferred to coalescer 178. The acid/water and mineral salts leave the bottom of the coalescer 178 and are transferred to an evaporator or distillation apparatus 182. The acid/water may be evaporated to a holding tank 184 for reuse and separated from the mineral salts which are transferred to tank 186.

These minerals may be sold as a fertilizer or further separated into their individual components by crystallization or competitive saturation.

The oil with its residual acid/water content is transferred from coalescer 178 to another mix tank 188. A caustic solution is added to the mix tank 188 from tank 190 and the two are mixed. The overflow is then pumped or transferred to coalescer 192.

The neutral water and mineral salts leave the bottom of the coalescer 192 and are transferred to an evaporator or distillation apparatus 196. The neutral water may be evaporated to a holding tank 198 for reuse and separated from the mineral salts which are transferred to tank 200. These minerals may be sold as a fertilizer or further separated into their individual components by crystallization or competitive saturation.

The oil with its residual neutral water content is transferred from coalescer 192 to a third mix tank 202. Clean or pure water is added to the mix tank 202 from tank 204 and the two are mixed. This step removes any neutral salts from the oil. The overflow is then pumped or transferred to a third coalescer 206. Oil with its water content is transferred to an oil dryer 130, which may be an evaporator or other combination of heat, mixing and vacuum necessary to remove the water from the oil. The water leaving the bottom of coalescer 206 is pumped or otherwise transferred to a discard or reuse tank 208.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A method for separating oils and minerals from pretreated feces comprising:
    a. receiving pretreated feces including viscous liquids, oils, and minerals,
    b. mixing said pretreated feces with an acid-water solution,
    c. separating at least a portion of said minerals and oils of step b to yield a first portion containing an oil/acid-water solution with some remaining minerals, and a second portion containing minerals with some residual acid-water solution,
    d. treating said second portion with a caustic solution to neutralize residual acid and separating water from said second portion to yield a third mineral portion, followed by transferring said oil/acid-water solution from step c to a first coalescer to separate said oil from said acid-water solution,
    e. evaporating or distilling said acid-water solution from step d to yield mineral salts,
    f. mixing said oil and a residual acid-water solution separated in step d with a caustic solution to yield an oil/neutral-water solution,
    g. transferring said oil/neutral-water solution of step f to a second coalescer to separate said oil from said neutral-water solution,
    h. evaporating or distilling said neutral-water solution of step g to yield mineral salts,
    i. transferring said oil and a residual neutral-water solution of step g to a third coalescer to separate said oil from said residual neutral-water solution, and
    j. drying said oil of step i to remove any remaining water in said oil.

2. The method as set forth in claim 1 wherein step b includes mixing said pretreated feces and said acid-water solution for a period of up to 24 hours.

3. The method as set forth in claim 1 wherein step b includes heating said mixture.

4. The method as set forth in claim 1 wherein step b includes mixing said pretreated feces and said acid-water solution one to four times allowing the mixture to rest between mixing.

5. The method as set forth in claim 1 wherein step f includes mixing said oil and a residual acid-water solution and caustic solution for a period of up to 24 hours.

6. The method as set forth in claim 1 wherein step f includes heating said mixture.

7. The method as set forth in claim 1 wherein step f includes mixing said oil and a residual acid-water solution and caustic solution one to four times allowing the mixture to rest between mixing.

\* \* \* \* \*